United States Patent
Mitjana

(10) Patent No.: US 7,043,212 B1
(45) Date of Patent: May 9, 2006

(54) SYSTEM AND METHOD FOR TRANSMITTING SIGNALS IN A RANDOM ACCESS CHANNEL OF A RADIO COMMUNICATION SYSTEM

(75) Inventor: Enric Mitjana, Heidenheim (DE)

(73) Assignee: Siemens Aktiengellschaft, Munich (DE)

( * ) Notice: Subject to any disclaimer, the term of this patent is extended or adjusted under 35 U.S.C. 154(b) by 0 days.

(21) Appl. No.: 09/868,248

(22) PCT Filed: Dec. 9, 1999

(86) PCT No.: PCT/DE99/03938

§ 371 (c)(1),
(2), (4) Date: Jun. 15, 2001

(87) PCT Pub. No.: WO00/38453

PCT Pub. Date: Jun. 29, 2000

(30) Foreign Application Priority Data

Dec. 18, 1998 (DE) ................................. 198 58 725

(51) Int. Cl.
*H04B 1/04* (2006.01)
(52) U.S. Cl. ..................................... 455/127.1; 455/522

(58) Field of Classification Search ............. 455/127.1, 455/434, 445, 522
See application file for complete search history.

(56) References Cited

U.S. PATENT DOCUMENTS 6,272,354 B1 * 8/2001 Saario ........................ 455/522

FOREIGN PATENT DOCUMENTS

| DE | 198 17 771 A1 | 4/1998 |
| EP | 0 565 507 A2 | 10/1993 |
| WO | WO 95/24102 | 9/1995 |
| WO | WO 98/48575 | 10/1998 |

OTHER PUBLICATIONS

"Modification of the Current RACH Scheme for Increased Throughput", ETSI SMG2 L1 Expert Group, Tdoc.SMG2 UMTS-L1 455/98 (Oct. 14, 1998).
David et al., "Digitale Mobilfunksysteme", Teubner Stuttgard (1996).

* cited by examiner

*Primary Examiner*—Bing Q. Bui
(74) *Attorney, Agent, or Firm*—Morrison & Foerster LLP

(57) ABSTRACT

A system and method for transmitting signals in a communication system in a random access channel of a radio communication system.

11 Claims, 4 Drawing Sheets

SYSTEM AND METHOD FOR TRANSMITTING SIGNALS IN A RANDOM ACCESS CHANNEL OF A RADIO COMMUNICATION SYSTEM

CLAIM FOR PRIORITY

This application claims priority to International Application No. PCT/DE99/03938 which was published in the German language on Dec. 9, 1999.

TECHNICAL FIELD OF INVENTION

The invention relates to a method and system for transmitting signals in a communication system, and in particular, to a method and subscriber station for transmitting signals in a random access channel of a radio communication system.

BACKGROUND OF THE INVENTION

WO 95/24102 discloses a method for prioritizing calls in a mobile radio system in which a higher transmitting power is used for calls with high prioritization than for calls with lower priority. In the case of the calls with high priority, the transmission power is in each case increased by a constant amount. In EP 0 565 507 A, access bursts are transmitted in a mobile radio system in order to minimize interference at relatively low power. If the message is not detected, it is retransmitted with an in each case increasing power level until it is finally detected.

In radio communication systems, messages (for example voice, picture information or other data) are transmitted via a radio interface with the aid of electromagnetic waves. The radio interface relates to a connection between a base station and subscriber stations, where the subscriber stations can be mobile stations or stationary radio stations. The electromagnetic waves are radiated by carrier frequencies which are within the frequency band provided for the respective system. For future radio communication systems, for example the UMTS (Universal Mobile Telecommunication System) or other third-generation systems, frequencies are provided in the frequency band of approx. 2000 MHz.

A random access channel (RACH) of a radio communication system is characterized by the access to this channel not being coordinated. The mobile stations of a radio cell can use this channel without prior allocation in order to request, for example, a subsequent allocation of radio resources, e.g. when setting up a connection.

Due to the uncoordinated access, however, collisions occur between the transmissions of the individual mobile stations. If the transmissions of a number of mobile stations become superimposed in a receiving base station, the transmissions are no longer detectable and thus the mobile stations do not receive an acknowledgement of the transmission.

After a collision, the mobile stations attempt to retransmit in the random access channel. The more frequently the access has to be repeated, the longer the waiting time and the lower the efficiency of this access method.

DE 198 17 771 discloses admitting access blocks which are orthogonal to one another in time and reducing the probability of a collision by selecting one of a number of different access blocks, i.e. of different transmitting times within the channel.

ETSI SMG2 UMTS L1 Expert Group, Tdoc SMG2 UMTS-L1 455/98, Oct. 14, 1998, discloses another possibility for improving the efficiency of the described method. In this document, it is proposed to provide an incremental increase in power. The mobile station begins with a transmitting power which is reduced with respect to the normal power setting and incrementally increases the transmitting power until reception is acknowledged by the base station.

SUMMARY OF THE INVENTION

In one embodiment of the invention, there is a method for transmitting signals in a random access channel in a radio communication system having first and second subscriber stations. The method includes, for example, using the random access channel in an uncoordinated manner, determining an attenuation value for a respective transmission path for each subscriber station; and carrying out a signal transmission in the channel at a transmitting power which corresponds to the previously determined attenuation value, wherein the second subscriber station carry out a signal transmission in the channel at a transmitting power which is greater than a transmitting power corresponding to the previously determined attenuation value, so that the transmitting power is increased compared with the greater transmitting power.

In one aspect of the invention, the signal transmissions of the subscriber stations relate to certain applications, and a higher priority is allocated to the applications relating to the signal transmissions of the second subscriber stations before the signal transmission, than to the applications relating to the signal transmissions of the first subscriber stations.

In another aspect of the invention, the subscriber stations transmit signals which relate to a request for allocation of radio resources, an acknowledgement or messages for updating the location of subscriber stations.

In still another aspect of the invention, there is the signal transmission, a higher priority is allocated to the second subscriber stations compared with the first subscriber station.

In yet another aspect of the invention, the signal transmissions of the subscriber stations relate to certain services, and a higher priority is allocated to the services relating to the signal transmissions of the second subscriber station, before the signal transmission, than to the services relating to the signal transmissions of the first subscriber station.

In another aspect of the invention, the increase in transmitting power is changed with retransmission of the signal by the second subscriber station.

In still another aspect of the invention, the attenuation values for the transmission path are determined by evaluating the received power of a control channel.

In another aspect of the invention, the channel is a broadband channel and is arranged in accordance with a TDD or FDD mode of a UMTS mobile radio system.

In another embodiment of the invention, there is a subscriber station for a radio communication system which has a random access channel which is used in an uncoordinated manner by subscriber stations. The system includes, for example, a transmitting device to transmit signals in the random access channel, a unit to determine an attenuation value for a respective transmission path; and a control device to set transmit power for the signal transmission to a value which is greater than a transmitting power corresponding to the previously determined attenuation value.

BRIEF DESCRIPTION OF THE DRAWINGS

Exemplary embodiments of the invention will be explained in greater detail with reference to the attached drawings, in which.

DETAILED DESCRIPTION OF THE PREFERRED EMBODIMENTS

Figure 1:
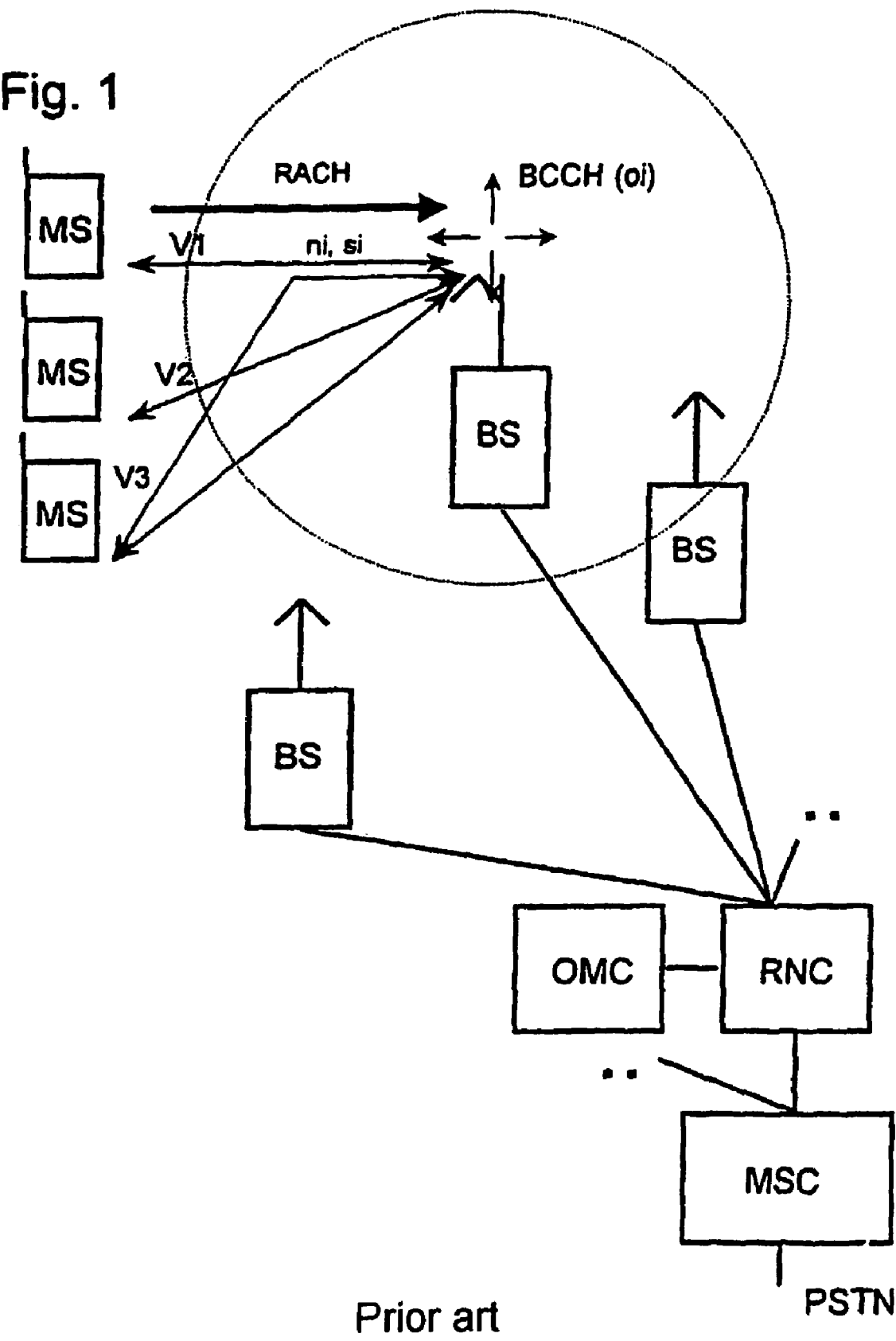
FIG. 1 shows a radio communication system.

The invention discloses increasing the efficiency of the signal transmission in the random access channel.

According to one embodiment of the invention, a number of subscriber stations use the random access channel in an uncoordinated manner and transmit signals with a transmitting power corresponding to predetermined attenuation values. In this rearrangement, however, the transmitting power is excessively increased for a subset of the first transmissions of the signal transmission. If there are collisions between two transmissions which now do not have the same received power at the base station, at least the more powerful signal can be utilized and the transmission of the weaker signal needs to be repeated when there is sufficient difference in power. On average, this reduces the delay before the transmissions are successfully received.

Utilizing the so-called capture effect, a signal will succeed if the transmitting powers have been set in such a way that, in contrast to a uniform equalization of the attenuations of the transmission path, a transmission is already transmitted at excessive transmission power at the first time. In contrast to the solution according to ETSI SMG2 UMTS-L1 Expert Group, Tdoc SMG2 UMTS-L1 455/98, Oct. 14, 1998, not all subscriber stations are treated the same way and transmissions do not first occur at reduced transmitting power.

According to another embodiment of the invention, the transmitting power is increased for a subset of applications. These applications are prioritized with respect to the probability of immediate detection. Such prioritization can also apply to a subset of the subscriber stations or a subset of services apart from the application, e.g. as request for the allocation of radio resources, as acknowledgement or as message for updating the location of subscriber stations. This makes it possible for the operater of the radio communication system to differentiate within applications, subscriber stations or services and to charge correspondingly for higher quality.

As an alternative, it is possible that the subscriber stations arbitrarily increase the transmitting power in deviation from predetermined attenuation values. As a result of this message, the number of undetected transmissions will also drop, even if not in accordance with priorities, and the efficiency of the method will increase.

According to still another embodiment of the invention, the transmitting power is excessively increased. The probability of transmissions arriving simultaneously with the same received power at the base station is further reduced. The transmission with the transmitting power with the greater excessive increase is successful. In the case of retransmissions, excessive increase is changed. This can be done in the direction of reduced or increased transmitting power. This prevents the transmissions of two subscriber stations from taking place in parallel continuously with excessively increased but equal transmitting power. The choice in method is made by the subscriber station in an arbitrary manner, that is to say in a manner which is not necessarily the same for all subscriber stations.

In one aspect of the invention, the utilization of a resource unit of the radio resources in radio communication systems has broadband channels, since the smallest resource unit is relatively large. The channels are organized in accordance with a TDD or FDD mode of a UMTS mobile radio system.

The mobile radio system shown in FIG. 1, as an example of a radio communication system, includes a multiplicity of mobile switching centers MSC which are networked together and, respectively, represent the access to a landline network PSTN. Furthermore, these mobile switching centers MSC are connected to, in each case, at least one device RNC for controlling the base stations BS and for allocating radio resources, i.e. a radio resource manager. Each of these devices RNC, in turn, provides for a connection to at least one base station BS. Such a base station BS can set up a connection to a subscriber station, e.g. mobile stations MS or other types of mobile and stationary terminals, via a radio interface. Each base station BS forms at least one radio cell.

FIG. 1 shows by way of example connections V1, V2, V3 for transmitting user information ni and signaling information as point-to-point connections between mobile stations MS and a base station BS and a control channel BCCH as point-to-multipoint connection. In the control channel BCCH, control information oi is transmitted by the base station BS at a known constant transmitting power. This information can be utilized by subscriber stations MS and can include information on the services offered in the radio cell and on the configuration of the channels of the radio interface. In the uplink UL, a random access channel RACH is offered to the subscriber stations MS.

An operation and maintenance center OMC implements control and maintenance functions for the mobile radio system or, respectively, for parts thereof. The functions of this structure can be transferred to other radio communication systems in which the invention can be used, particularly for subscriber access networks with wireless subscriber access and for base stations and subscriber stations operated in the unlicensed frequency band.

In the text which follows, the invention will be explained with reference to a mobile radio system having a radio interface in the TDD (time division duplex) transmission method, use in the FDD (frequency division duplex) transmission method also being possible.

Figure 2:
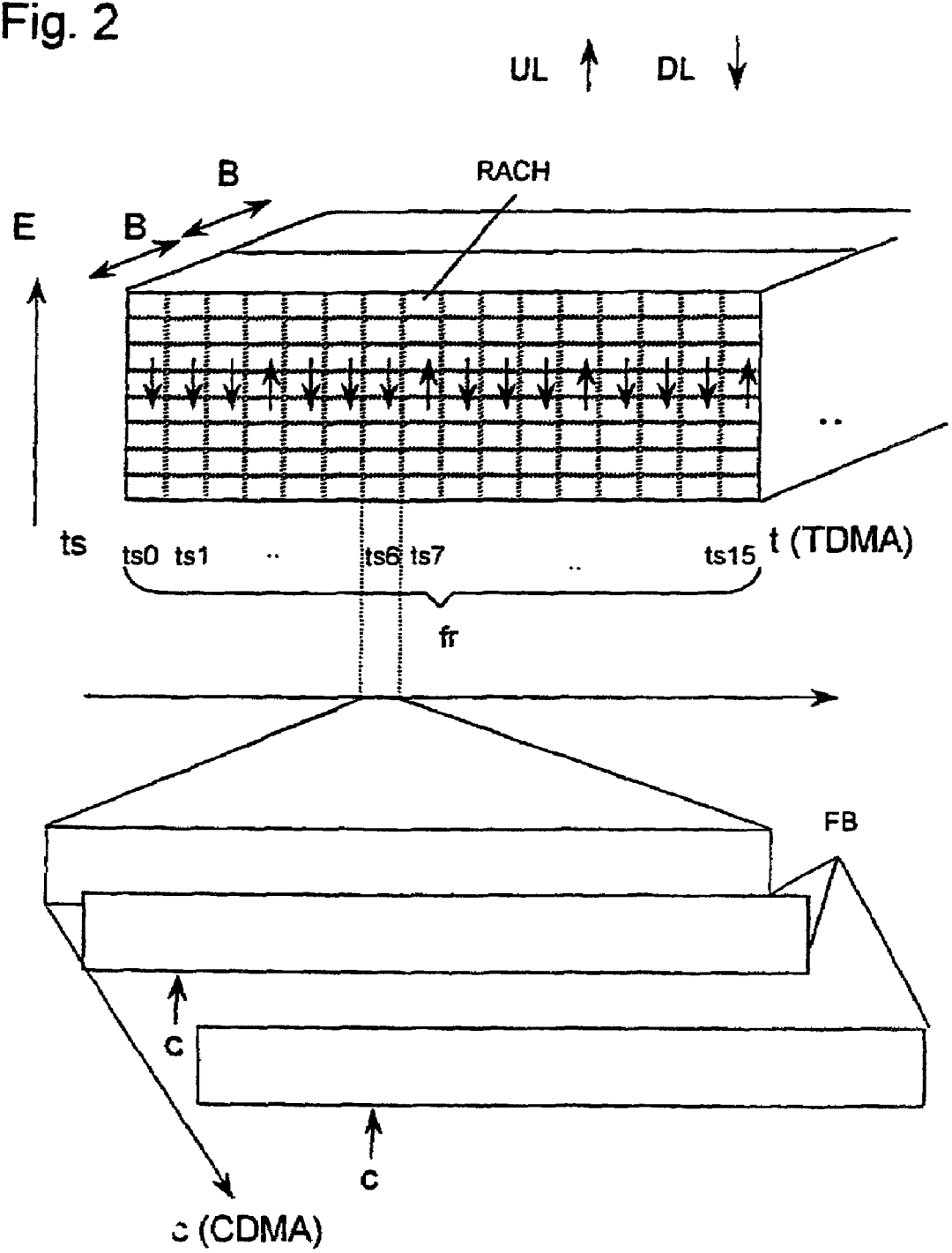
FIG. 2 shows an exemplary TDD radio interface between base station and subscriber stations.

FIG. 2 shows the frame structure of a TDD radio transmission. According to a TDMA (time division multiple access) component, a broadband frequency band, for example of bandwidth B=5 MHz, is divided into a number of timeslots ts of the same duration, for example 16 timeslots ts0 to ts15 per frame fr. Some of the timeslots ts are used in the downlink DL and some of the timeslots are used in the uplink UL. In this TDD transmission method, the frequency band for the uplink UL corresponds to the frequency band for the downlink DL.

Within a timeslot ts6, information of a number of connections is transmitted in message blocks FB. The data d are spread with a fine structure, a spread-spectrum code c for each connection so that at the receiving end, for example, n connections can be separated by this CDMA (code division multiple access) component.

A timeslot ts7 in the uplink UL is used as random access channel RACH which can be accessed in an uncoordinated manner by the mobile stations MS. This random uncoordinated access can be used for the following applications:

initial access for setting up a connection,
transmission of small data packets,
transmission of an acknowledgement of received data packets,
request of the mobile station MS for allocation of radio resources during a connection,
updating of the location of the mobile station MS in the so-called "idle state".

Although the mobile stations MS use the random access channel RACH in an uncoordinated manner, they do so with regulated transmitting power. For this purpose, attenuation values (path loss) are initially determined by measurements. The attenuation values can be advantageously determined by evaluation of the received power of the control channel BCCH, see FIG. 3. The control channel BCCH is continuously accessible and transmits at a known transmitting power. From the measured received power at the mobile station MS, a control device in the mobile station MS can calculate the transmitting power of a transmitting device of the mobile station MS which is necessary for a particular received power at the base station BS and which guarantees compensation for the loss. The lower the received power at the mobile station MS, the greater the transmitting power which must be set in the uplink UL.

Figure 3:
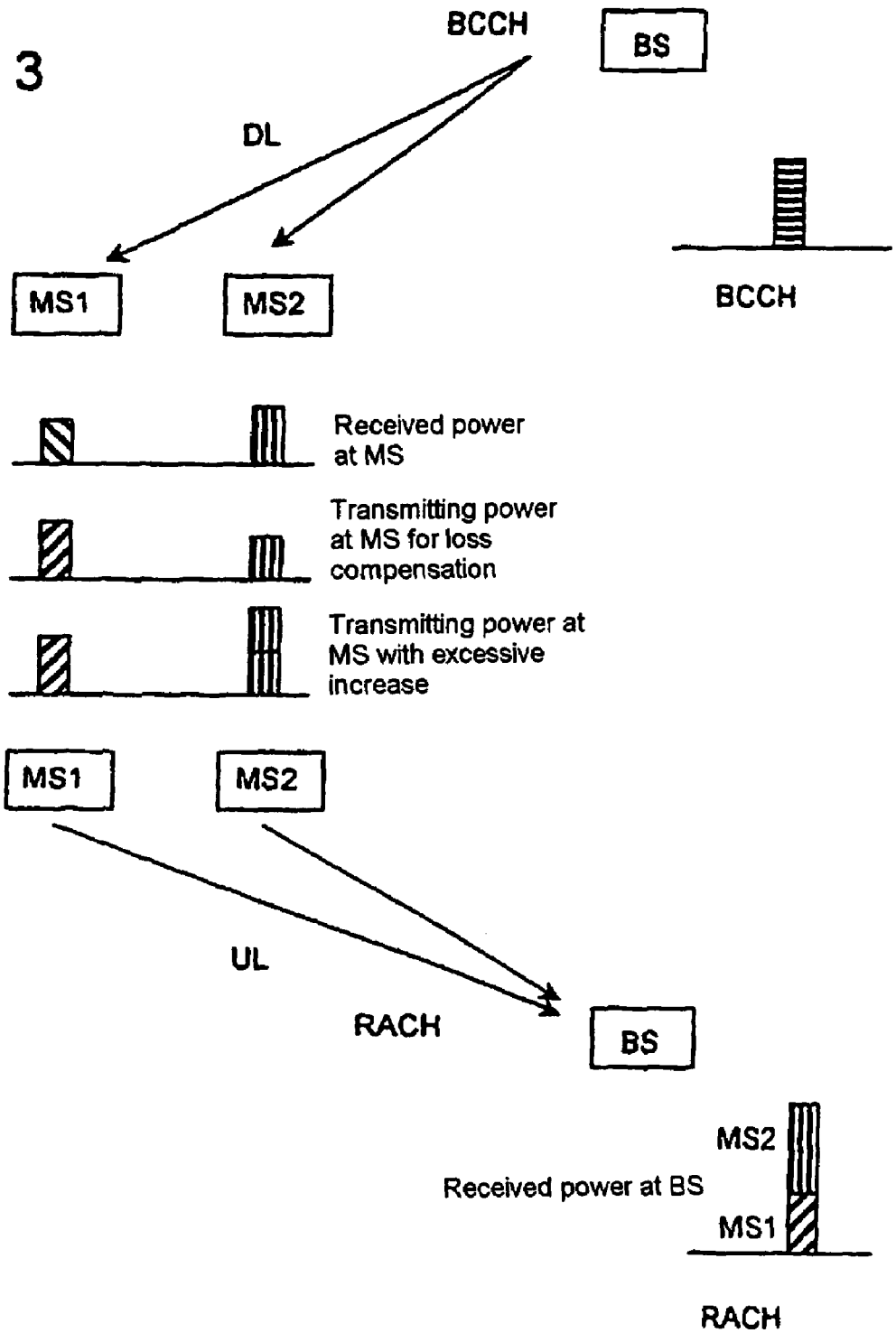
FIG. 3 shows an example of the transmitting power adjustment.

However, not all the mobile stations MS are necessarily transmitting, and not all are necessarily transmitting continuously at this calculated transmitting power. However, a subset of the applications, mobile stations MS or services (e.g. by the quality of service QoS) are prioritized so that an excessive transmitting power can also be used in the first transmission. In FIG. 3, mobile station MS2 is prioritized. This excessive increase also leads to an increased received power in the RACH channel at the base station BS. It is also within the scope of the invention that, in general, the level of the transmitting power of the initial transmission is lowered down to the subset.

In comparison with a transmitting power referred to the attenuation, the transmitting power selected by a mobile station MS can be excessively increased to be lower, equal to or in accordance with a particular portion of the method. A corresponding picture is produced with respect to the received power at the base station BS in the case of simultaneous transmission by the two mobile stations MS1 and MS2. In FIG. 3, the proportion of power of the signal is much greater from mobile station MS2 than from mobile station MS1. This results in a high probability that the received power will be sufficiently greater for a transmission to provide for utilization. Even in the case of collisions, i.e. the same type of use of the RACH channel by a number of mobile stations MS. In this case, the remaining transmissions need to be repeated. If necessary, the repetition is carried out with an excessive increase in transmitting power and at a time interval which can be individually defined by each mobile station MS.

Figure 4:
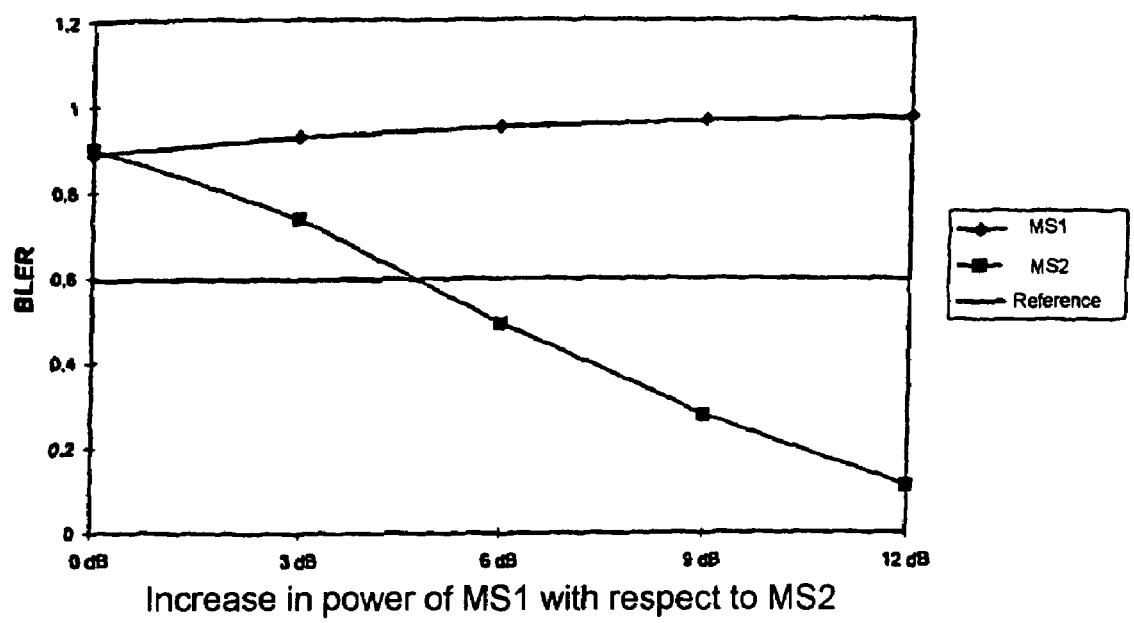
FIG. 4 shows a simulation result.

FIG. 4 shows the result of a simulation which compares the probability of utilizability (BLER—block erasure rate) of two transmissions transmitted in the same frequency band, with the same spread-spectrum code and in the same timeslot. The parameter is the difference in power between the transmitting powers over and above the differences in attenuation. The greater the excessive increase in transmitting power, the greater the probability of utilizability.

The invention claimed is:

1. A method for transmitting signals in a random access channel in a radio communication system having a plurality of subscriber stations, the method comprising:
using the random access channel in an uncoordinated manner; and
determining an attenuation value for a respective transmission path for each subscriber station;
wherein the subscriber stations transmit the signals in the random access channel at transmitting powers which are greater than transmitting powers corresponding to the respective previously determined attenuation values by arbitrary amounts, such that the transmitting power of each of the plurality of subscriber stations is not identical.

2. The method as claimed in claim 1, wherein signal transmissions of the subscriber stations relate to certain applications, and a higher priority is allocated to the applications relating to the signal transmissions of a second group of subscriber stations before the signal transmission, than to the applications relating to the signal transmissions of a first group of subscriber stations.

3. The method as claimed in claim 2, wherein the subscriber stations transmit signals which relate to a request for allocation of radio resources, an acknowledgement or messages for updating the location of subscriber stations.

4. The method as claimed in claim 1, wherein before the signal transmission, a higher priority is allocated to a second group of subscriber stations compared with a first group of subscriber stations.

5. The method as claimed in claim 1, wherein the signal transmissions of the subscriber stations relate to certain services, and a higher priority is allocated to the services relating to the signal transmissions of a second subscriber station, before the signal transmission, than to the services relating to the signal transmissions of a first subscriber station.

6. The method as claimed in claim 1, wherein the increase in transmitting power is changed with retransmission of the signal by a second subscriber station.

7. The method as claimed in claim 1, wherein the attenuation values for the transmission path are determined by evaluating the received power of a control channel.

8. The method as claimed in claim 1, wherein the channel is a broadband channel and is arranged in accordance with a TDD or FDD mode of a UMTS mobile radio system.

9. The method as claimed in claim 1, wherein each of a first group of subscriber stations transmits the signals in the random access channel at transmitting powers which correspond to the previously determined attenuation values.

10. A subscriber station for a radio communication system which has a random access channel which is used in an uncoordinated manner by subscriber stations, comprising:
a transmitting device to transmit signals in the random access channel;
a unit to determine an attenuation value for a respective transmission path; and
a control device to set transmit power for the signal transmission to a value which is greater than a transmitting power corresponding to the previously determined attenuation value.

11. A method for transmitting signals, comprising:
transmitting signals in a random access channel;
determining an attenuation value for a respective transmission path; and
setting a transmitting power for the transmitting of the signals at a value which is greater than a transmitting power corresponding to the previously determined attenuation value.

* * * * *